US009809977B2

(12) United States Patent
Carney et al.

(10) Patent No.: US 9,809,977 B2
(45) Date of Patent: Nov. 7, 2017

(54) DIGITAL MATERIAL ASSEMBLY BY PASSIVE MEANS AND MODULAR ISOTROPIC LATTICE EXTRUDER SYSTEM

(71) Applicant: Massachusetts Institute of Technology, Cambridge, MA (US)

(72) Inventors: Matthew Eli Carney, Brookline, MA (US); Benjamin Jenett, Cambridge, MA (US); Neil Gershenfeld, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 15/035,009

(22) PCT Filed: May 5, 2016

(86) PCT No.: PCT/US2016/031069
§ 371 (c)(1),
(2) Date: May 6, 2016

(87) PCT Pub. No.: WO2016/179441
PCT Pub. Date: Nov. 10, 2016

(65) Prior Publication Data

US 2017/0145694 A1 May 25, 2017

Related U.S. Application Data

(60) Provisional application No. 62/158,424, filed on May 7, 2015.

(51) Int. Cl.
*E04B 1/19* (2006.01)
*E04C 3/02* (2006.01)
(Continued)

(52) U.S. Cl.
CPC ................ *E04C 3/02* (2013.01); *B23P 19/04* (2013.01); *B64C 1/068* (2013.01); *E04B 1/19* (2013.01); *B23P 2700/01* (2013.01)

(58) Field of Classification Search
CPC ............. E04C 3/005; E04C 2003/0495; E04C 2003/0486; E04B 1/19; E04B 2001/1987
See application file for complete search history.

(56) References Cited

U.S. PATENT DOCUMENTS 4,237,662 A * 12/1980 Kinzler .................... B64G 9/00 52/108
4,633,566 A * 1/1987 Coppa ...................... B64G 9/00 244/159.4
(Continued)

FOREIGN PATENT DOCUMENTS

WO WO9609447 A1 3/1996
WO WO2014025944 A3 2/2014

OTHER PUBLICATIONS

J. Hiller et al., "Methods of Parallel Voxel Manipulation for 3D Digital Printing," in Proceedings of the 18th solid freeform fabrication symposium., 2007, p. 12.
(Continued)

*Primary Examiner* — Rodney Mintz
*Assistant Examiner* — Daniel Kenny
(74) *Attorney, Agent, or Firm* — Flachsbart & Greenspoon, LLC

(57) ABSTRACT

A set of machines and related systems build structures by the additive assembly of discrete parts. These digital material assemblies constrain the constituent parts to a discrete set of possible positions and orientations. In doing so, the structures exhibit many of the properties inherent in digital communication such as error correction, fault tolerance and allow the assembly of precise structures with comparatively imprecise tools. Assembly of discrete cellular lattices by a
(Continued)

Modular Isotropic Lattice Extruder System (MILES) is implemented by pulling strings of lattice elements through a forming die that enforces geometry constraints that lock the elements into a rigid structure that can then be pushed against and extruded out of the die as an assembled, load-bearing structure.

23 Claims, 16 Drawing Sheets

(51) Int. Cl.
*B64C 1/06* (2006.01)
*B23P 19/04* (2006.01)

(56) References Cited

U.S. PATENT DOCUMENTS 4,677,803 A * 7/1987 Mikulas, Jr. ............ E04H 12/18 182/152
4,878,286 A * 11/1989 Coppa ...................... B64G 9/00 29/429
4,885,891 A 12/1989 Lynch
4,920,710 A * 5/1990 Paine .................... E04H 12/185 52/108
6,192,634 B1 2/2001 Lopez
6,558,065 B2 * 5/2003 Huang ................... A63H 33/04 403/170
7,118,442 B2 * 10/2006 Laliberte ................ A63H 33/06 403/176
7,318,303 B1 * 1/2008 Kling ........................ E04B 1/19 52/648.1
7,848,838 B2 12/2010 Gershenfeld et al.
8,011,162 B2 * 9/2011 Overby ................... E04C 3/005 52/108
8,042,305 B2 * 10/2011 Pryor ..................... B64G 1/222 244/159.4
2012/0094060 A1 4/2012 Gershenfeld et al.
2012/0151868 A1 6/2012 Kang et al.
2014/0037873 A1 2/2014 Cheung et al.
2014/0300211 A1 10/2014 Peek et al.
2014/0302261 A1 10/2014 Cheung et al.

OTHER PUBLICATIONS

D. Darooka et al., "Advanced Space structure Concepts and their development", in AIAA Structures, Structural Dynamics, and Materials Conference, 2001.
T. Murphey, "'Booms and Trusses,'" in Recent Advances in Gossamer Spacecraft, 2006.
X. Zheng et al., "Ultralight, ultrastiff mechanical metamaterials.," Science, vol. 344, No. 6190, pp. 1373-1377, 2014.
H. Wadley et al., "Fabrication and Structural Performance of Periodic Cellular Metal Sandwich Structures", Composites Science and Technology, 63, p. 2331-2343, 2003.
K. Cheung et al., "Reversibly assembled cellular composite materials.," Science, vol. 341, No. 6151, pp. 1219-1221, 2013.
Written Opinion of the International Searching Authority, International Application No. PCT/US2016/031069, dated Oct. 4, 2016.
International Search Report, International Application No. PCT/US2016/031069, dated Oct. 4, 2016.
Search History, International Application No. PCT/US2016/031069, dated Sep. 13, 2016.
Notification of Transmittal of the International Search Report and the Written Opinion of the International Searching Authority, or the Declaration, dated Oct. 4, 2016.
Notification of Transmittal of International Preliminary Report on Patentability, dated Jul. 3, 2017, in PCT/US16/31069.
International Preliminary Report on Patentability, dated Jul. 3, 2017, in PCT/US16/31069.

* cited by examiner

DIGITAL MATERIAL ASSEMBLY BY PASSIVE MEANS AND MODULAR ISOTROPIC LATTICE EXTRUDER SYSTEM

This application claims the benefit of U.S. Provisional Application No. 62/158,424, filed May 7, 2015, the entire disclosure of which is herein incorporated by reference.

This invention was made with government support under Grant/Contract No. NSF CMMI-1344222 awarded by NSF, Grant/Contract No. NNX14AG47A awarded by NASA, and NNX14AM40H awarded by NASA. The government has certain rights in the invention.

TECHNICAL FIELD OF THE INVENTION

The present invention relates to digital material assembly, and more specifically to digital material assembly by passive means and assembly of discrete cellular lattices.

BACKGROUND OF THE INVENTION

This invention describes a set of machines, and a structural system capable of building structures by the additive assembly of discrete parts. These digital material assemblies (described, in part, in U.S. Pat. No. 7,848,838, US20120094060, WO2014025944, US20140302261, US20140300211) constrain the constituent parts to a discrete set of possible positions and orientations. In doing so, the structures exhibit many of the properties inherent in digital communication such as error correction, fault tolerance and allow the assembly of precise structures with comparatively imprecise tools. The machines responsible for assembling digital materials should leverage, to the extent possible, the interlocking and error-correction naturally present in the discrete parts.

Field of Technology

Prior work has been done in making machines that assemble structures from discrete parts. Hiller et al. showed a method of parallel part placement of voxel spheres in [J. Hiller and H. Lipson, "Methods of Parallel Voxel Manipulation for 3D Digital Printing," in Proceedings of the 18th solid freeform fabrication symposium., 2007, p. 12.]. These voxels, however, do not interlock in a structural way and so a binder must be used after depositing the spheres. Customizable pultrusion systems have been used for creating high performance iso-grid tubes [D. Darooka and D. Jensen, "Advanced Space structure Concepts and their development", in AIAA Structures, Structural Dynamics, and Materials Conference, 2001.]. Deployable composite structures have been used in space applications for decades, and their reliability and stiffness to weight ratio are optimized [T. Murphey, "'Booms and Trusses,'" in Recent Advances in Gossamer Spacecraft, 2006, p. 1-43.]. Few of these processes are reversible, incremental, or able to result in volumetric structures. 3D printing of lattices results in ultralight, high performance structures [X. Zheng, et al, "Ultralight, ultrastiff mechanical metamaterials.," Science, vol. 344, no. 6190, pp. 1373-7, 2014.], but is not scalable beyond the printing machine. Assembled cellular lattices have been used as sandwich materials [H. Wadley, et al, "Fabrication and Structural Performance of Periodic Cellular Metal Sandwich Structures", Composites Science and Technology, 63, p. 2331-2343, 2003.] and space filling structures [K. Cheung and N. Gershenfeld, "Reversibly assembled cellular composite materials.," Science, vol. 341, no. 6151, pp. 1219-21, 2013.], but their assembly is manual and thus throughput and scale limited.

SUMMARY OF THE INVENTION

This invention describes a set of machines, and a structural system capable of building structures by the additive assembly of discrete parts. These digital material assemblies constrain the constituent parts to a discrete set of possible positions and orientations. In doing so, the structures exhibit many of the properties inherent in digital communication such as error correction, fault tolerance and allow the assembly of precise structures with comparatively imprecise tools. The machines responsible for assembling digital materials should leverage, to the extent possible, the interlocking and error-correction naturally present in the discrete parts.

A part type that demonstrates this behavior is a triangle shape. The triangle can be combined into any number of geometric shapes—cells—which when repeatedly patterned, or tiled, form rigid or deformable closed cell polyhedral volumes that make up lattice structures. A single, triangular, nearly planar part type assembles to form the four faces of a tetrahedron or the eight faces of an octahedron, or other triangulated geometries. The repeated tiling of these geometries form lattice structures whose global stiffness properties are dependent on the relative orientation of the polyhedral enclosed volumes and the connectivity of struts between the nodes of the triangles. In this manner rigid or deformable lattice structures may be constructed.

Assembly of discrete cellular lattices is implemented by three varying strategies incorporating these common features of discretely interlocked base elements.

Assembly of discrete cellular lattices is implemented by feeding (triangular) base elements from a magazine-like storage in an axially symmetric manner, their placement mechanically timed such that they form closed polyhedral when interlocked to a previously placed layer forms a rigid structure.

Assembly of discrete cellular lattices is implemented by feeding (triangular) base elements that are connected by a carrier that physically defines a distance constraint between neighboring elements such that they are pulled through a forming die that enforces further geometry constraints that lock the elements into a rigid structure.

The modular isotropic lattice extruder system (MILES) assembles discrete cellular lattices by pulling strings of lattice elements through a forming die, enforcing geometric constraints and programmatically controlled interlocking of elements into a rigid structure that can then be extruded out of the die as an assembled, load-bearing structure.

DETAILED DESCRIPTION OF INVENTION

Figure 1A:
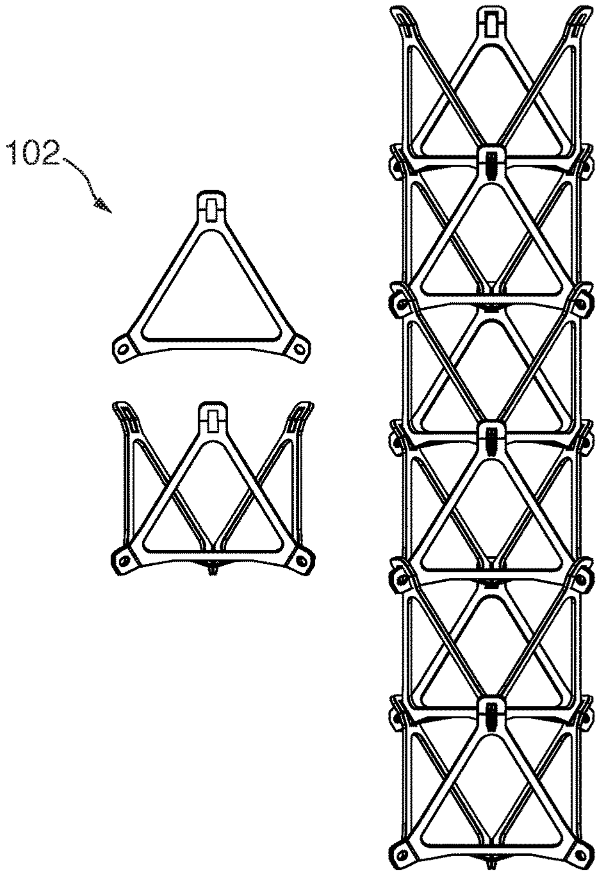
FIG. 1A shows discrete elements arranged in cells and column motif.
Figure 1B:
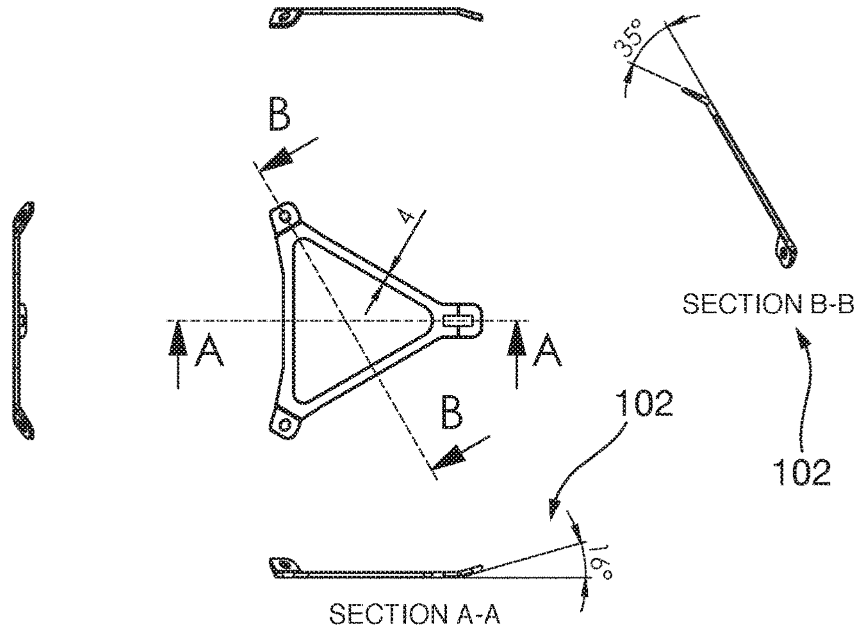
FIG. 1B shows interface components.
Figure 1C:
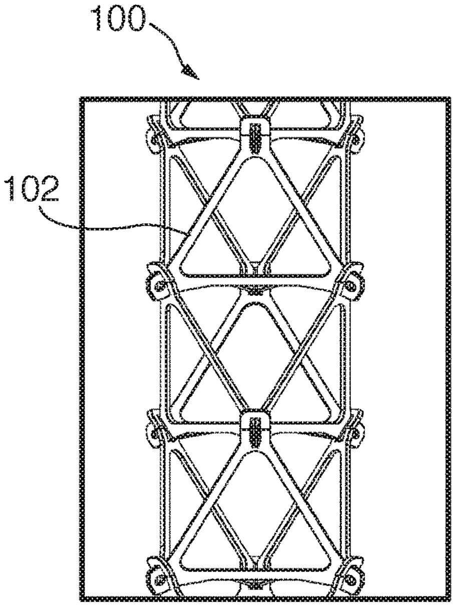
FIG. 1C illustrates mechanical testing of column structure.
Figure 2:
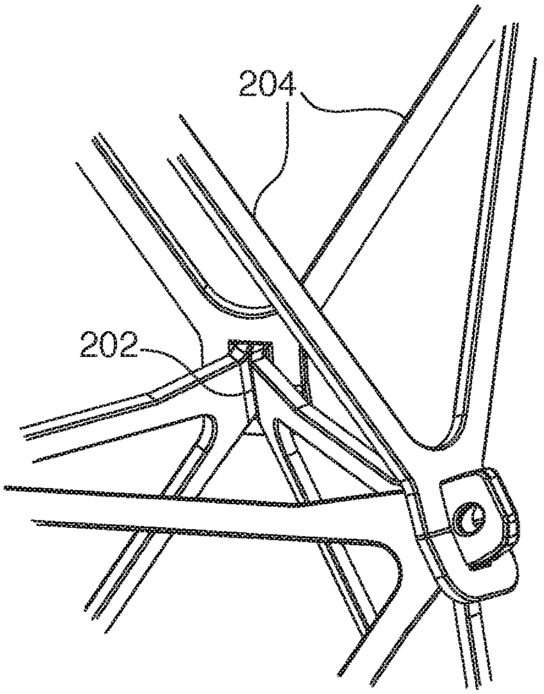
FIG. 2 illustrates a looped interface.
Figure 9:
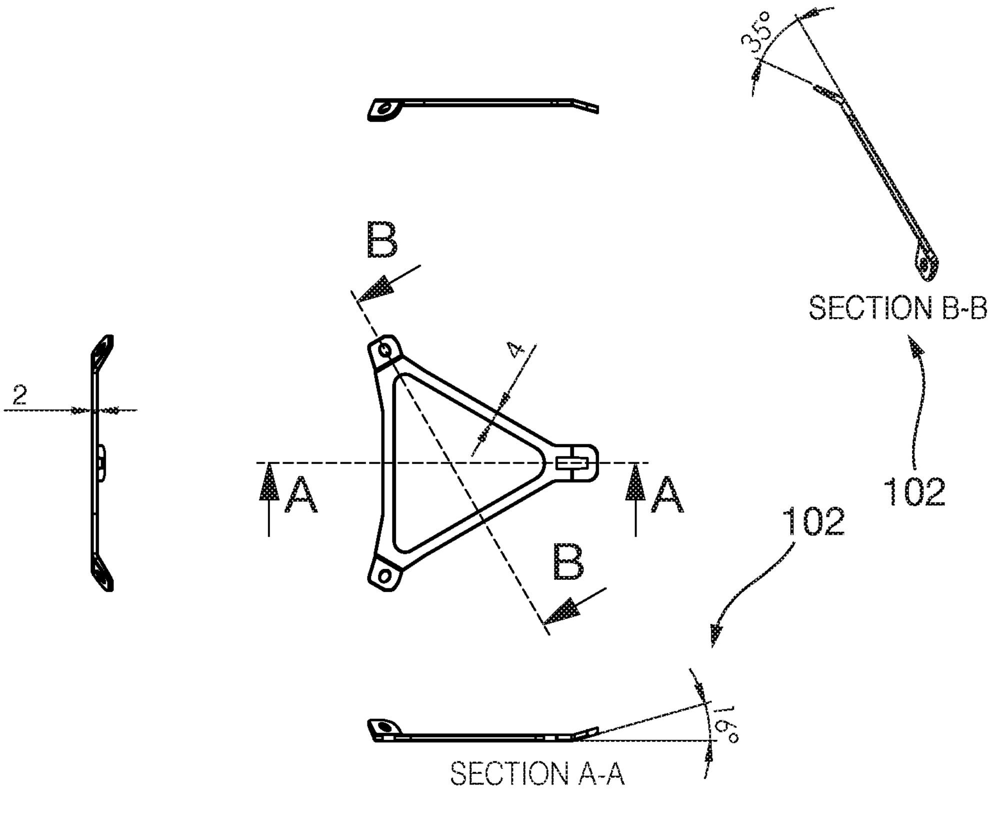
FIG. 9 is another view of interface components shown in FIG. 1B.

FIG. 1A shows tiles 102 in three states: alone, arranged in cells to form a volume, and as cells placed in a column motif. FIG. 1B shows these tiles as interface components 102, isolated pre-assembly. FIG. 9 is another view of interface components shown in FIG. 1B. Note that two vertices (feet) each have a relatively small tab structure, bending out at an angle of sixteen degrees. The third vertex of the triangular tiles as depicted has a larger profile, bending out at thirty-five degrees, with a slot capable of receiving two of the smaller vertices/feet. The two smaller vertices each have apertures for receiving optimal external fasteners (discussed later). FIG. 1C illustrates mechanical testing of column structure 100, made of interface components 102 after assembly. One embodiment of assembled triangles form stacked octahedra—an exactly constrained structural geometry. When the octahedra are assembled face to face, and placed upon the previous cell, only three triangular faces are required to effectively form the eight faces of each octahedron cell. This construction is statically and kinematically determinate following Maxwell's stability criterion; each frame consists of six joints, or nodes, connected by twelve non-collinear struts. FIG. 2 illustrates a looped interface of the two small feet engaged in a slot. Looking at it another way one node 202 is connected by six non-collinear struts 204, exactly constraining each node 202 (FIG. 2). Adjacent elements self-align, the next element locks the previous elements together. Columns generated with this geometry form a truss structure that forms an exactly constrained, triple, co-directional cross-linked helix 100 (FIG. 1). The truss distributes axial loads into transverse loads, effectively increasing the allowable aspect ratio of the buckling criteria of the column. Columns can be assembled into multiples of volumes. Alternatively, octahedral cells may be placed in an edge connected fashion to form complex multiples of volumes while retaining the node connectivity, and stiffness.

The triangular components are designed such that load paths align directly at the interface between components. The exact point of load alignment may not necessarily reside within the physical volume of the part, rather a virtual node may exist through which the loads effectively pass. The joint interface transmits primarily axial loads along the struts of the triangle, however it may also be designed such that moment couples are transmitted through the joint. The auxiliary geometry surrounding the interface node provides kinematic alignment features: geometry which passively, and repeatedly align the interfaces with respect to one another. In addition to alignment, the geometry at the interface also provides features for fixturing adjacent cells (FIG. 2).

Geometry of the discrete elements comprise constraints to adjacent cells that fixture their interfaces such that loads are transmitted directly through the geometry of the part. The geometry may include a feature that could be described as a loop, where material of one element surrounds the interface of at least one or more adjacent elements (FIG. 2). The loop from the next placed element locks the previously placed elements together, forming a constrained and load bearing cell. The geometry of the interface, that is the alignment of nodes, struts, alignment features and loops provides a system where tension and compression of the overall assembly both load the joint into a stable configuration such that secondary fastener components such as pins, clips, screws are not necessary. Secondary components can, though, be used to manage unexpected load conditions and for redundant connections. Pins or clips can provide additional resistance to separation of unloaded joints during torsion and bending. Traditional fastener types such as rivets or threaded interfaces may also be utilized to again provide robust fixturing.

Figure 3A:
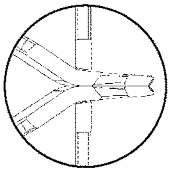
FIG. 3A shows the mating of element interfaces.
Figure 3:
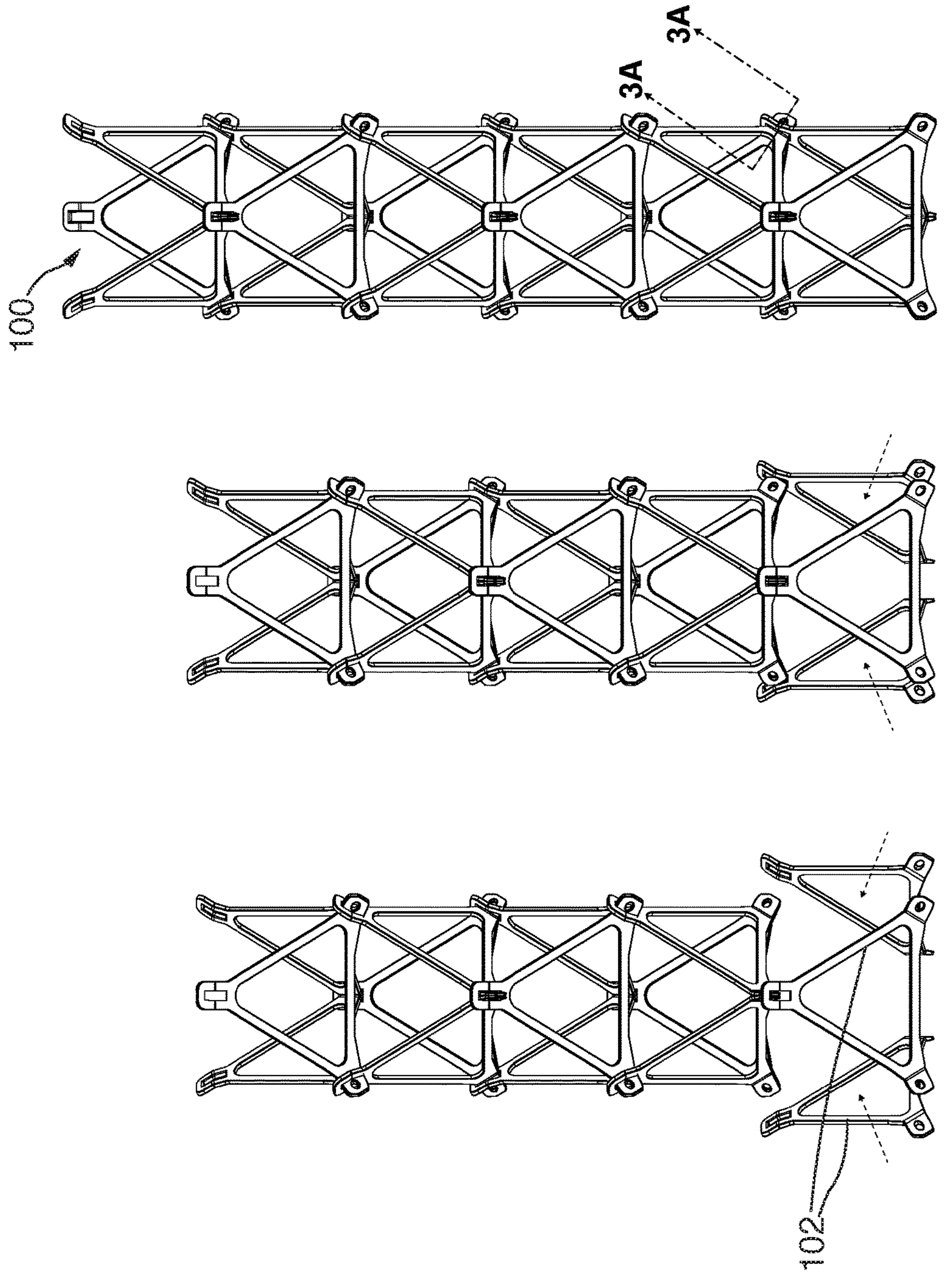
FIG. 3 is an assembly sequence and features of column.

FIG. 3 is an assembly sequence and features of the column 100. Assembly of the parts follows a specific trajectory to allow the element interfaces 102 to mate (shown in FIG. 3A). For the loop geometry it is possible to have a trajectory that follows a single degree of freedom along the centroidal plane normal vector (FIG. 3). The combination of this trajectory, the loop interface, and the arrangement of load paths allow an assembly procedure independent of material modulus of elasticity, where elastic coupling or flexural joints are not required, nor is a secondary fastener required to transmit load. Secondary fasteners may, however, be preferred for mechanical redundancy. Complex trajectory involving at least one or more degrees of freedom may also be utilized in other embodiments where the interface fixture geometry is aligned as orthogonal as possible to all other intentional load paths of the structure. Elastic joints may also be used to interlock the interface between discrete elements and also between cells.

The part geometry may be comprised of nearly planar shapes with at least one or more bends enabling a material and process independent manufacturing process (FIG. 1). Sheet-metal, concrete, formed wood, composites, injection molding, casting, 3d printing, additive or subtractive manufacturing are examples of processes capable of producing the discrete elements. The open face circumscribed by the struts is left unadulterated to allow placement of functional components such as: skins, health monitoring, actuation, energy harvesting, lighting, etc.

Assembly of the discrete elements exploits the integration of geometry between the discrete elements and the assembler mechanisms. Alignment features are shared between the two systems to balance complexity between the part and the machine. Previous digital material assemblers specified a machine that included: a chassis, connected to a locomotion or actuation system, connected to an assembly head, and connected to a parts feeder, all of this controlled by a computer processor. The geometry of the assembler in this embodiment integrates part feeding, locomotion, and chassis into one system. This assembler also removes the requirement for position controlled actuation, and removes the computer processor requirement; it can be driven with or without at least one prime mover. By making part placement with respect to the assembler, the number of assembler subsystems are reduced, and placement is made relative only to immediately local lattice elements, rather than discrete locations across the global structure, and the placement uncertainty is further reduced.

Three example embodiments are described that integrate multiple subsystems and remove the computer control requirement by integrating mechanical design with the periodic, structured nature of the lattice. The geometry of the assembler is designed to match the physical, periodic dimensions of the lattice. This allows mechanical timing of end-effector/foot trajectory through conventional power transmission systems (such as linkages, gears, belts, cables, track followers, hydraulics, pneumatics). Electrical timing is also possible by use of processor controlled actuators. The integration of locomotion actuation with parts placement also integrates error correction. At each step along the lattice the assembler becomes locked to the structure by attaching to either an already placed part or feeding a new part into place. The feeding mechanism is passive, such that a part is automatically driven into place by a stored energy mechanism. Parts are stored either locally in a magazine cartridge, a reel of components, remotely in a hopper type of system. Intermediate assembly mechanisms may also co-exist that allow more dense packing of discrete elements before being formed into cells to be placed. In some embodiments discrete elements may be formed into discrete cells which are then placed into the lattice.

Similar to a swiss screw machine mechanism features internal to the machine produce desired output: the timing, trajectories and forces necessary to perform the assembly or disassembly process. Mechanical timing is possible due to the periodic lattice structure and reduces the need for a computer based control system at the assembler level. In some instances it may still be beneficial to retain a computer control where sizing and integration of mechanical power transmission systems is non-trivial, or for convenience or flexibility in design.

Figure 4:
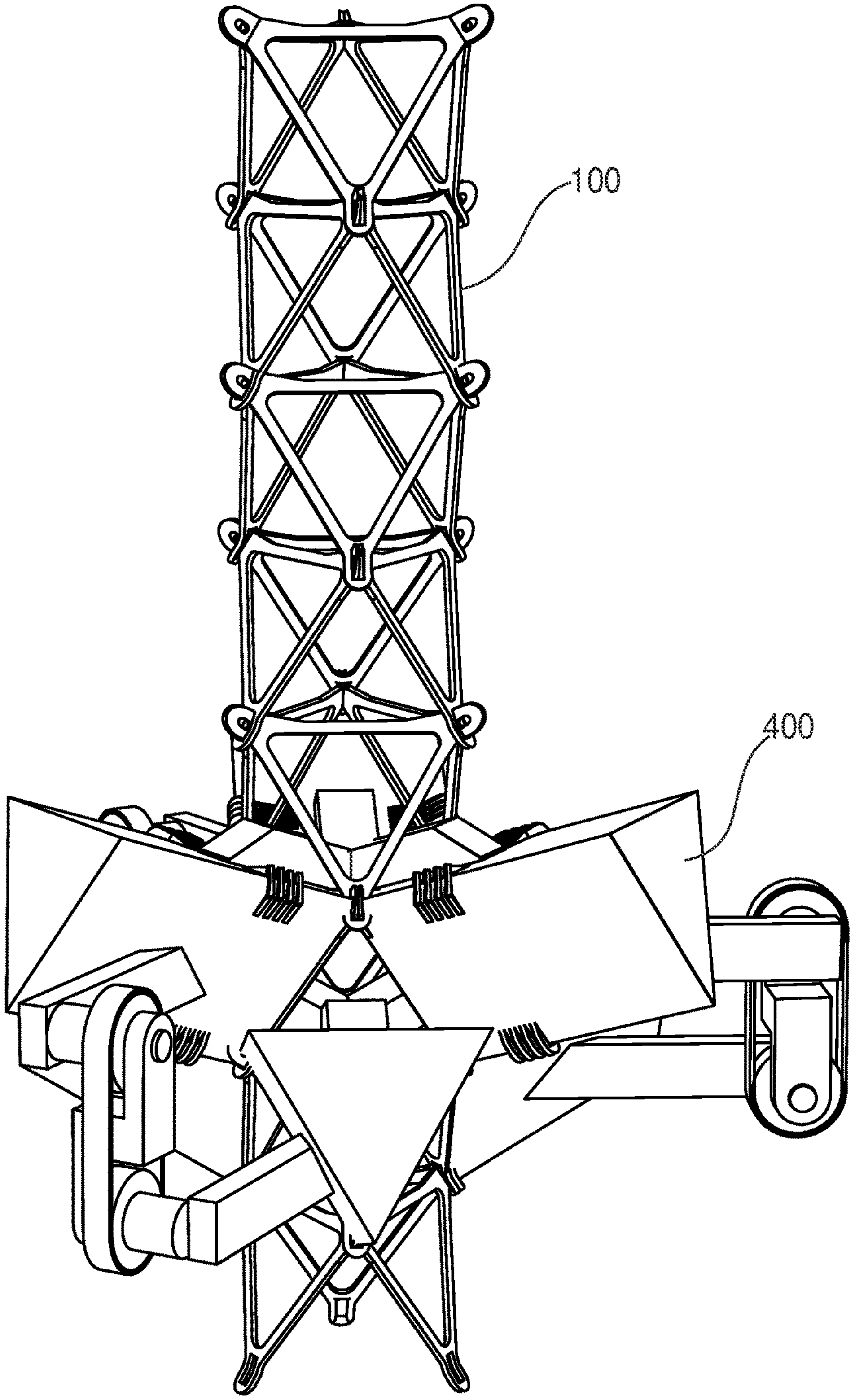
FIG. 4 is an active assembler latched to structure.

FIG. 4 is an active assembler 400 latched to structure 100. The active assembler 400 includes at least one or more repeating tiles 102 that latch together as they step along the lattice (FIG. 4). The foot is also the part placement, parts feeder and error correction mechanism. All operations happen internally and in parallel rather than as separate external systems, they can be mechanically or electrically driven. The feet have features (e.g., the slot in a large foot sized to receive two smaller feet) that provide kinematic alignment with the other foot mechanisms, therefore passively locating and locking each one to adjacent feet. Once located, either the new part is placed or the already placed part is locked-onto by the internal feed mechanisms, fixing the assembler to the structure. The previously placed foot of the assembler that was also attached to the previous part and adjacent feet then releases and is able to take the next step. The assembler moves the foot through a trajectory to get to the next position, this trajectory generation being comprised by conventional mechanical timing and power transmission systems. The necessary trajectory is dependent on lattice geometry and part interface design. A single prime mover, such as a motor is capable of driving the machine through the stepping process while a series of mechanical timing mechanisms or electrically controlled actuators drive the assembly and locking chain of events.

Figure 5A:
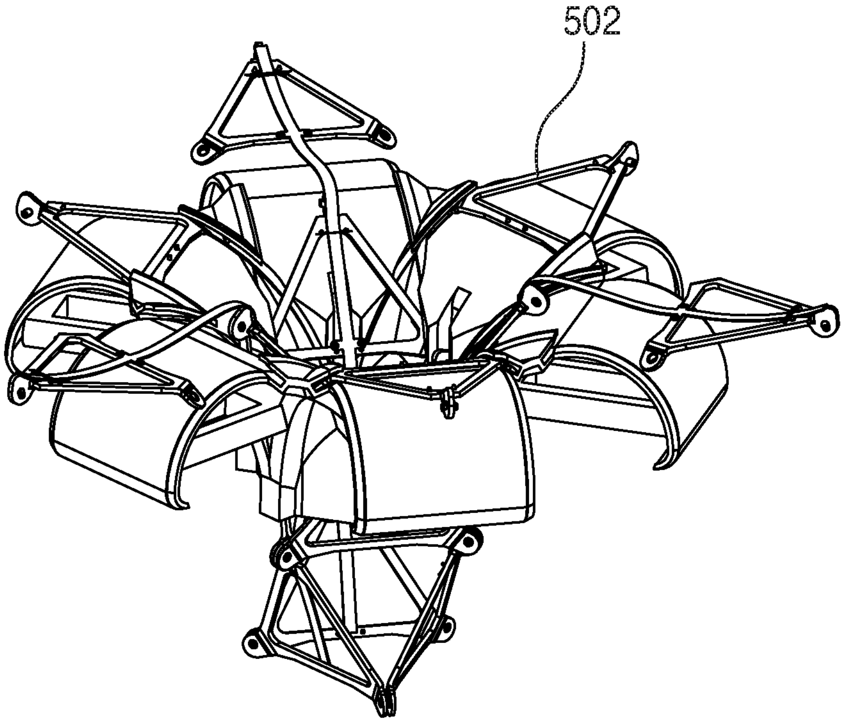
FIG. 5A is a passive assembler, working on principles similar to a 3D zipper.
Figure 5A:
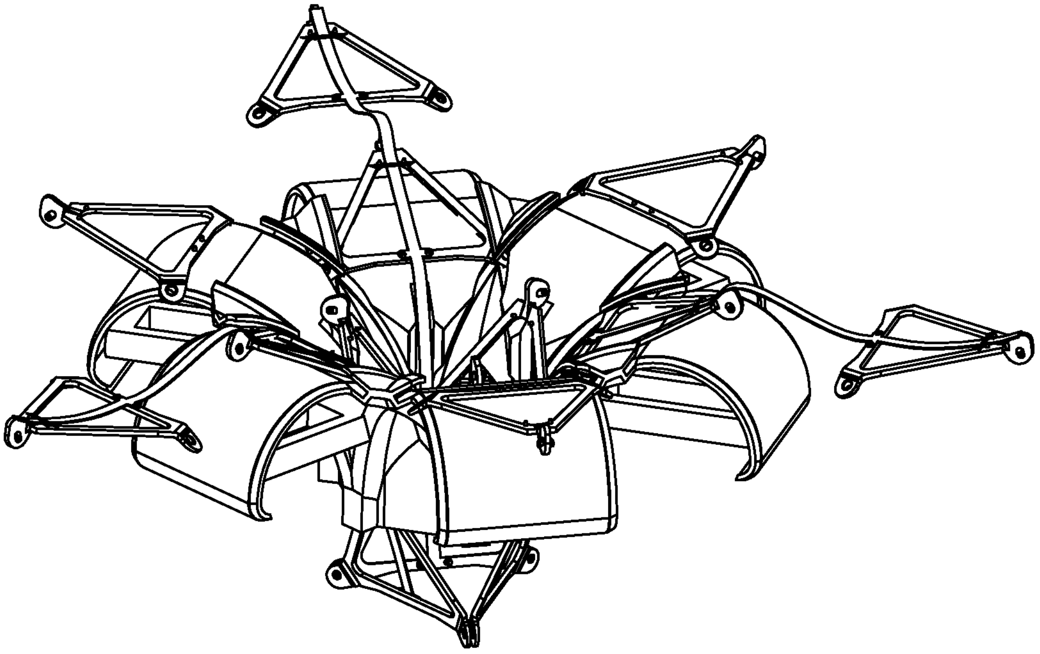
Figure 5B:
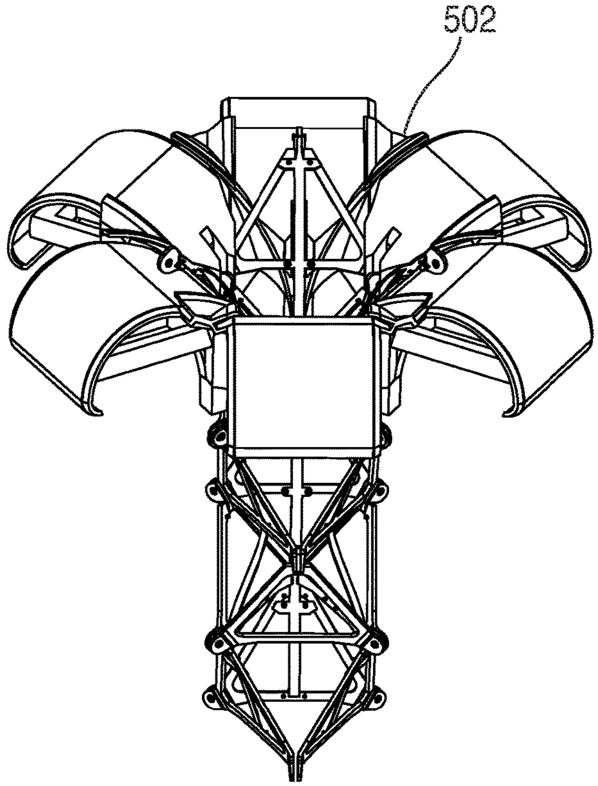
FIG. 5B is a passive assembler, related to FIG. 5A.
Figure 6A:
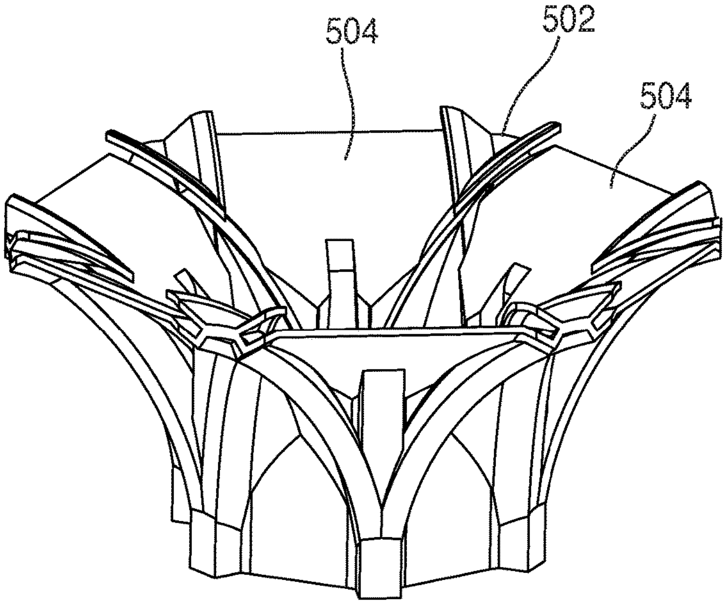
FIG. 6A is a head mandrel for the assembly of FIG. 5A or 5B.
Figure 6B:
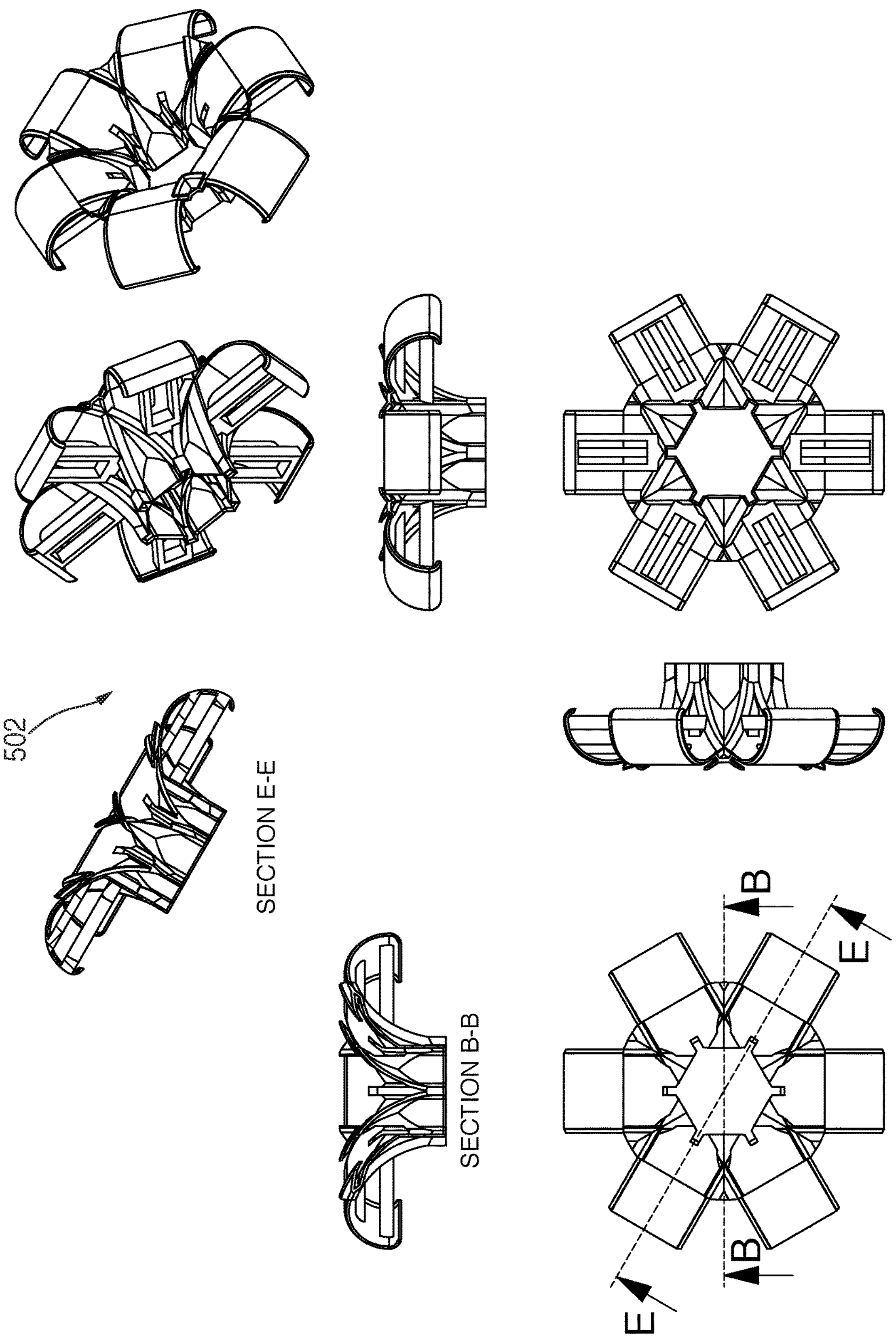
FIG. 6B depict alternate views of the assembly head mandrel.
Figure 7:
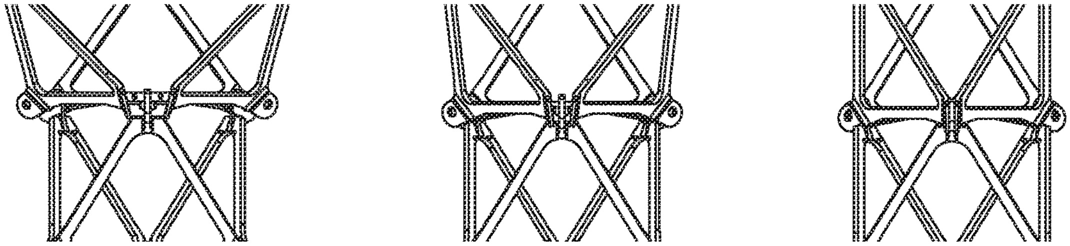
FIG. 7 shows the assembly sequence enforced by mandrel geometry.
Figure 8:
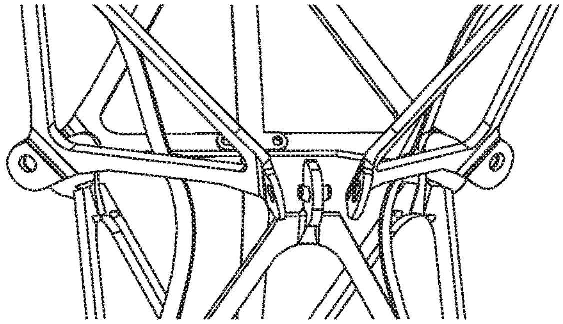
FIG. 8 illustrates another interface for an alternative lattice assembly.

FIG. 5A is a passive assembler, with properties similar to a so-called 3D zipper. A carrier element sets a distance constraint or timing between elements. FIG. 5B is a prototype of the passive assembler of FIG. 5A. A passive assembler relies on a three dimensional geometry of an assembly head, or a mandrel 502, to define the path that the discrete element tracks along as it is placed or removed from the lattice (FIG. 5). FIG. 6A shows the zipper assembly head mandrel 502. Tracks 504 in the mandrel enforce trajectory paths. FIG. 6B depict different views of the mandrel 502. The discrete element 102 follows along the path formed into the assembly head 502. Elements 102 are fixed in place by the placement of the following element 102. That is, the part is only fully constrained after the placement of following adjoining parts. FIG. 7 depicts the assembly sequence enforced by mandrel 502 geometry. FIG. 8 illustrates an interface for the assembly. The trajectory necessary to mate part interfaces is iteratively defined by the interface fixturing geometry while it is itself, also, informed by the possible trajectory (FIGS. 7, 8). Control of the timing for placement is defined by a distance constraint between parts that are to be collinear in their placed configuration. The distance constraint may be established by a carrier, such as a belt, cable or chain. In this way the assembly system is similar to that of a zipper, where individual elements are constrained by their neighbors in one direction, by a carrier in the opposite direction and their assembly trajectory is defined by a physical track that the parts are pulled through. The kinematics of this assembly strategy are that of a three-dimensional zipper. A single degree of freedom is necessary to pull the zipper assembly head along the structure. This degree of freedom may be actuated by external systems, or even the mass and inertia of the motion of an initial seed assembly sequence, where gravity provides the constant pulling force that drives the elements through the assembly head. The discrete elements may be stored in a magazine, cartridge, reel or hopper type of system.

An active carrier based method of assembly is possible where the discrete elements have a distance constraint formed by a rigid intermediary component connected by pivots, composing the discrete elements into a chain. A rack and pinion type of arrangement of rollers feeds the elements into the lattice, while locomoting along the lattice. The rigid elements pivot on their integrated carrier as they roll along the rollers, similar to a chain on a sprocket. The arrangement of adjacent rollers enables connecting the chains into volume enclosing structures.

Another embodiment of the assembler trades the carrier distance constraint for a mechanical timing constraint. In this way the discrete elements require no carrier. The track still provides the passive trajectory control while an active mechanism times the dispersal of discrete elements from their storage location and along the track. The latching may be performed by tooth geometry, adhesion such as vacuum, magnetics, hook and loop, adhesive bond, etc. Upon attachment of element to lattice the latch disengages. This mechanism may also provide a locomotion system that traverses along the already formed structure, such that the assembly is capable of self locomotion along the lattice.

Figure 10:
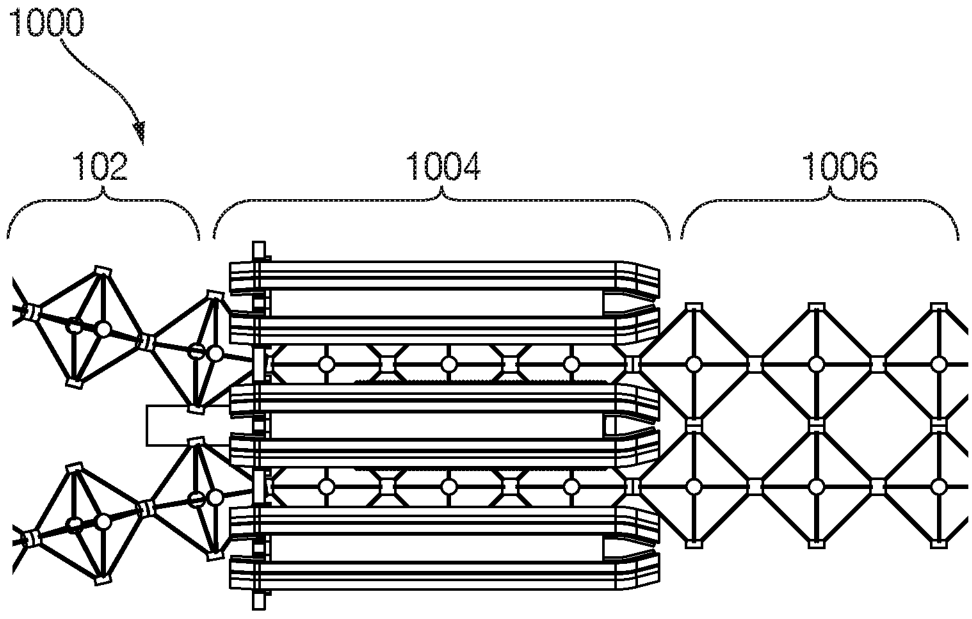
FIG. 10 is a side view of the Modular Isotropic Lattice Extrusion System (MILES).

FIG. 10 is a side view of the Modular Isotropic Lattice Extrusion System (MILES) 1000. MILES consists of three main components: the material feed 1002 is a chain of pre-assembled voxels, fed through a locomotion and joining assembly platform 1004, which uses a forming die to lock the elements together, and the final, joined, isotropic lattice 1006 which is ready for structural applications once it leaves the assembly platform 1004. Polyhedra are pre-assembled with connections along a node or an edge such that a string, or, chain of polyhedra is formed with at least one degree of freedom remaining between each neighboring polyhedra element (FIG. 10).

Figure 11:
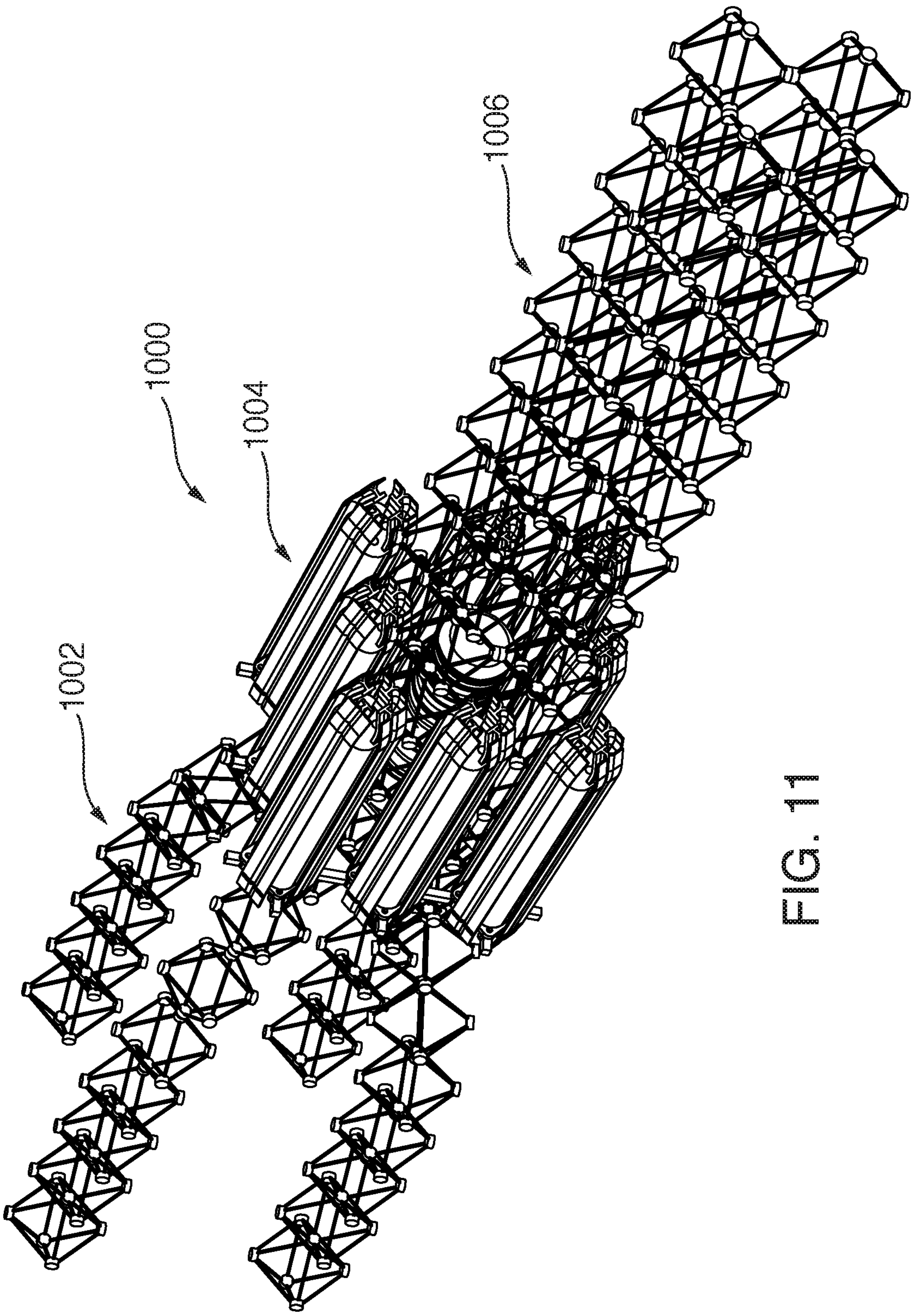
FIG. 11 is an isotropic view of a MILES module with material feeding through the forming section.

FIG. 11 is an isotropic view of a MILES module with material feeding 1002 through the forming section 1004. Four separate chains of material are seen coming into the assembly platform 1004, and they exit as a joined, 2×2 voxel chain 1006. This is the minimum required chain-to-structure ratio, and as a result, the assembly platform module 1004 as shown is considered the basic MILES unit.

Figure 12:
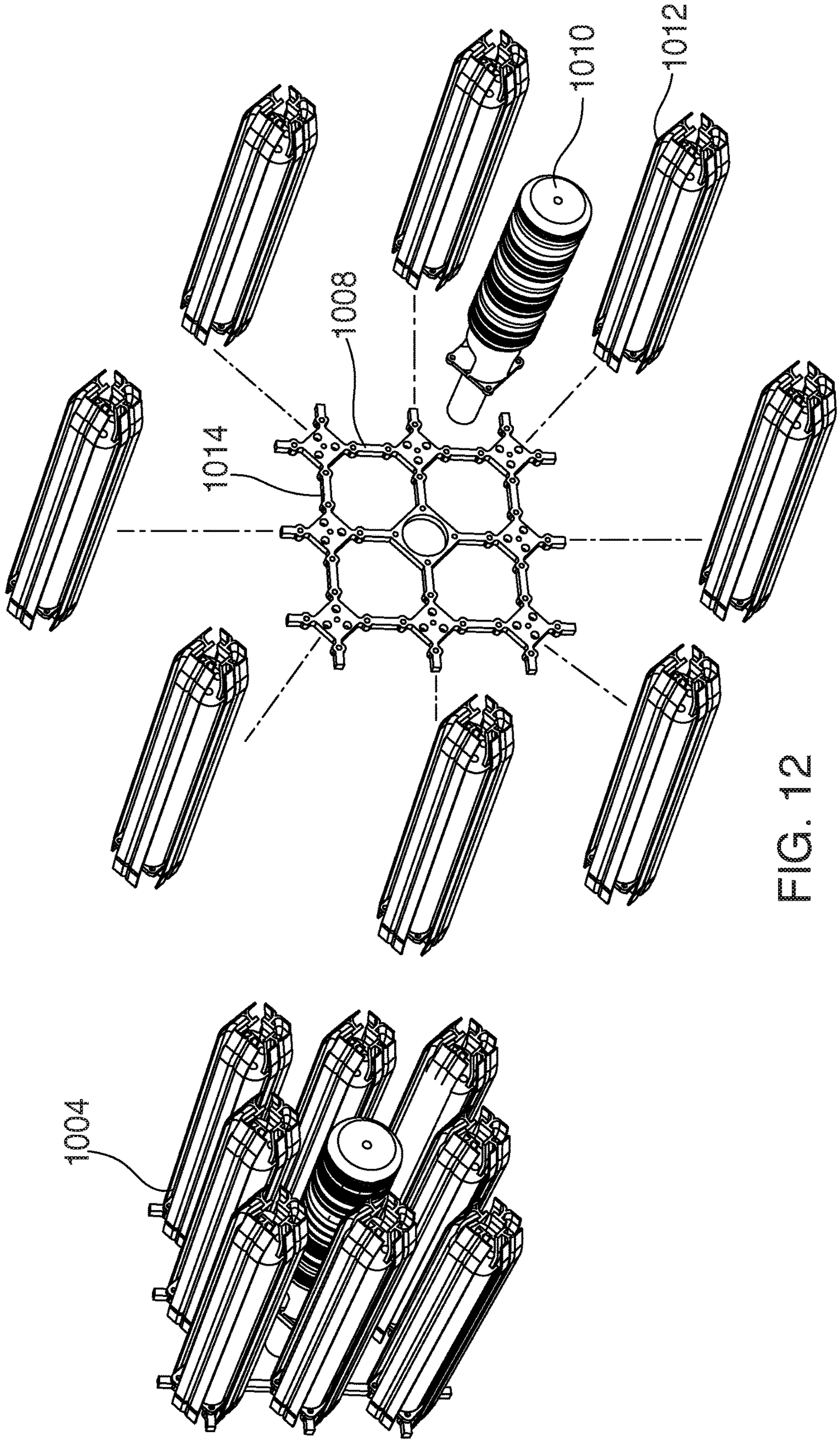
FIG. 12 is a view of a MILES unit and an exploded view of the MILES unit.
Figure 14:
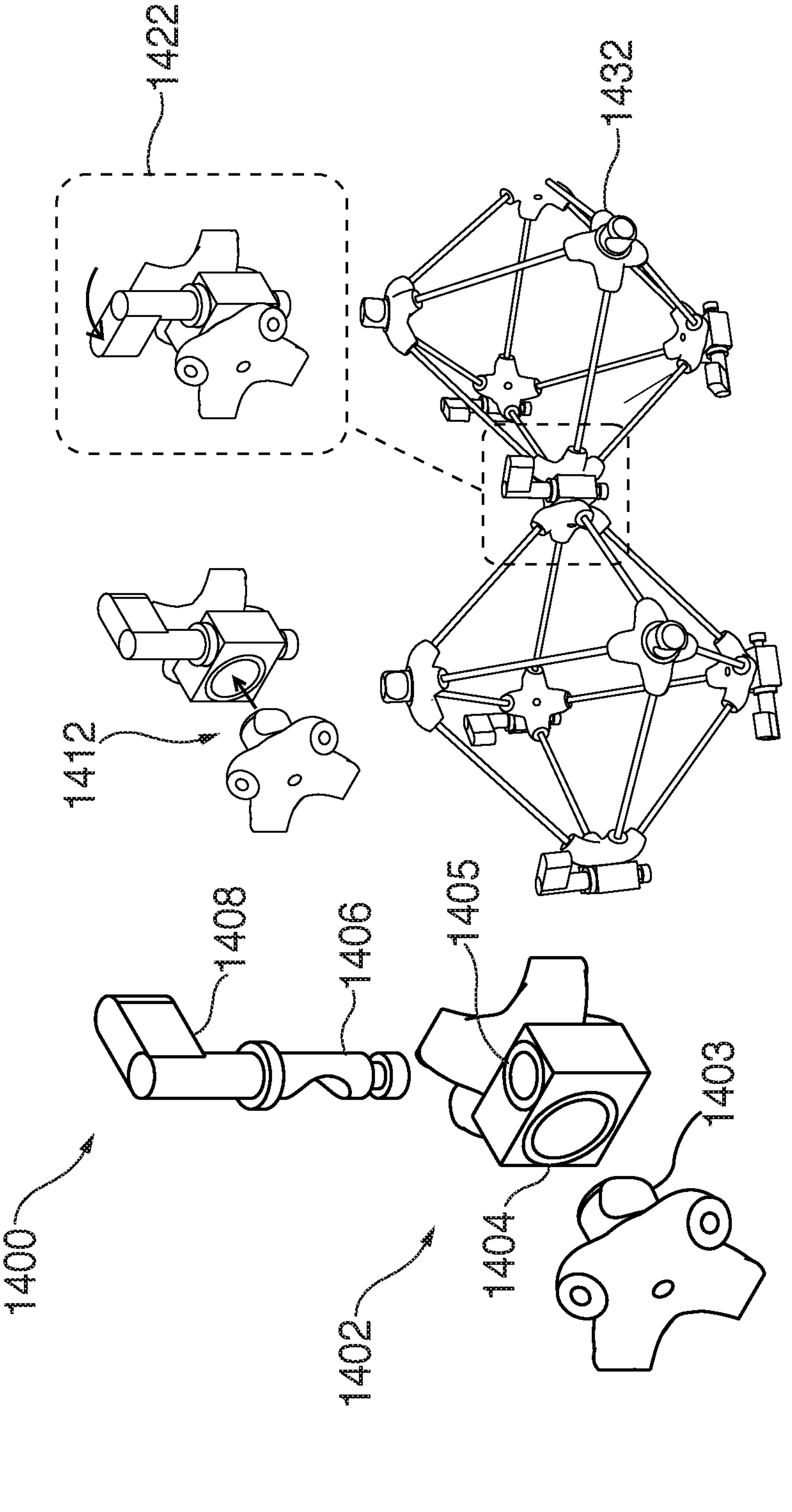
FIG. 14 shows a cam-lock interface, showing an exploded view, pre-lock, post-lock and locked voxels.

FIG. 12 is a view of a MILES unit 1004 and an exploded view of the MILES unit 1004. A rear mounting plate grid 1008 is the basic substructure and spacing enforcement for the MILES units. This should also be modular, so that the overall MILES system can be shaped based on functional requirements and constraints. MILES sub-modules mount directly to the grid. The locomotion module 1010 consists of a motor, whose control and power are assumed to be routed through the sub-grid 1014. The motor is coupled to a specialized worm gear, whose pitch and diameter is designed to match the internal spacing of the lattice being constructed around it. Thus, the driving worm gear moves the structure forward, bringing in new material feed 1002 and outputting completed structure 1006. The guide rail modules 1012 is a structural extrusion capped on all 4 sides with a low-friction contact surface (i.e.: PTFE) which guides the free material chains into their correct orientation. This guiding is critical because it lines up the nodes which are eventually forced together and joined with a reversible mechanical cam-lock interface (FIG. 14).

The chain of elements is pulled through a forming die that forces the elements into the final configuration orientated relative to neighboring strings of elements (FIGS. 10, 11, 12). In doing so, interlocking features at the nodes are forced into position. A secondary locking mechanism can then also be enforced as the nodes are dragged past a lock enforcement mechanism. One embodiment of the interlocking mechanism is shown in FIG. 14, where an eccentric self engaging cam is rotated into a locked position by a lever that is pulled past a special lock enforcement feature in the die. FIG. 14 shows a cam-lock interface 1400, showing an exploded view 1402, pre-lock 1412, post-lock 1422 and locked voxels 1432. A voxel in the material chain has a node with a male interface (1403). This tapered cylinder has a crescent shape cut out of it, which will be used to engage the cam-lock. It is forced by the guide rails into the neighboring voxel chain with female interfaces (1404). As shown in the center image, the lock pin is pre-inserted through its guide hole in the female interface (1405). It is kept in place by a pin feature at the bottom of the shaft (1406). The male interface is allowed to pass by the lock pin due to a feature in the pin (1407). The lock pin has a lever arm (1408) that is passively turned roughly 90 degrees as the material chains pass through the assembly platform. This engages a cam-locking interaction between (1403) and (1407), whereby the male interface is prevented from pulling out, and pulling on it forces the lock pin to rotate in a direction that further tightens the interface. This joint is completely reversible and because it comes pre-assembled it requires no additional hardware.

This lock enforcement feature may be active or passive such that lock engagement at specific nodes can be programmatically controlled enabling arbitrary structural geometries to be generated, or, it may be passive in the case of constructing large bulk materials. A motion inducing mechanism then forces the already assembled, rigid, structure out of the die. This system can be constructed as a standalone module or it can then be assembled alongside other modules into extensible arrays of modules (FIG. 13).

Figure 13:
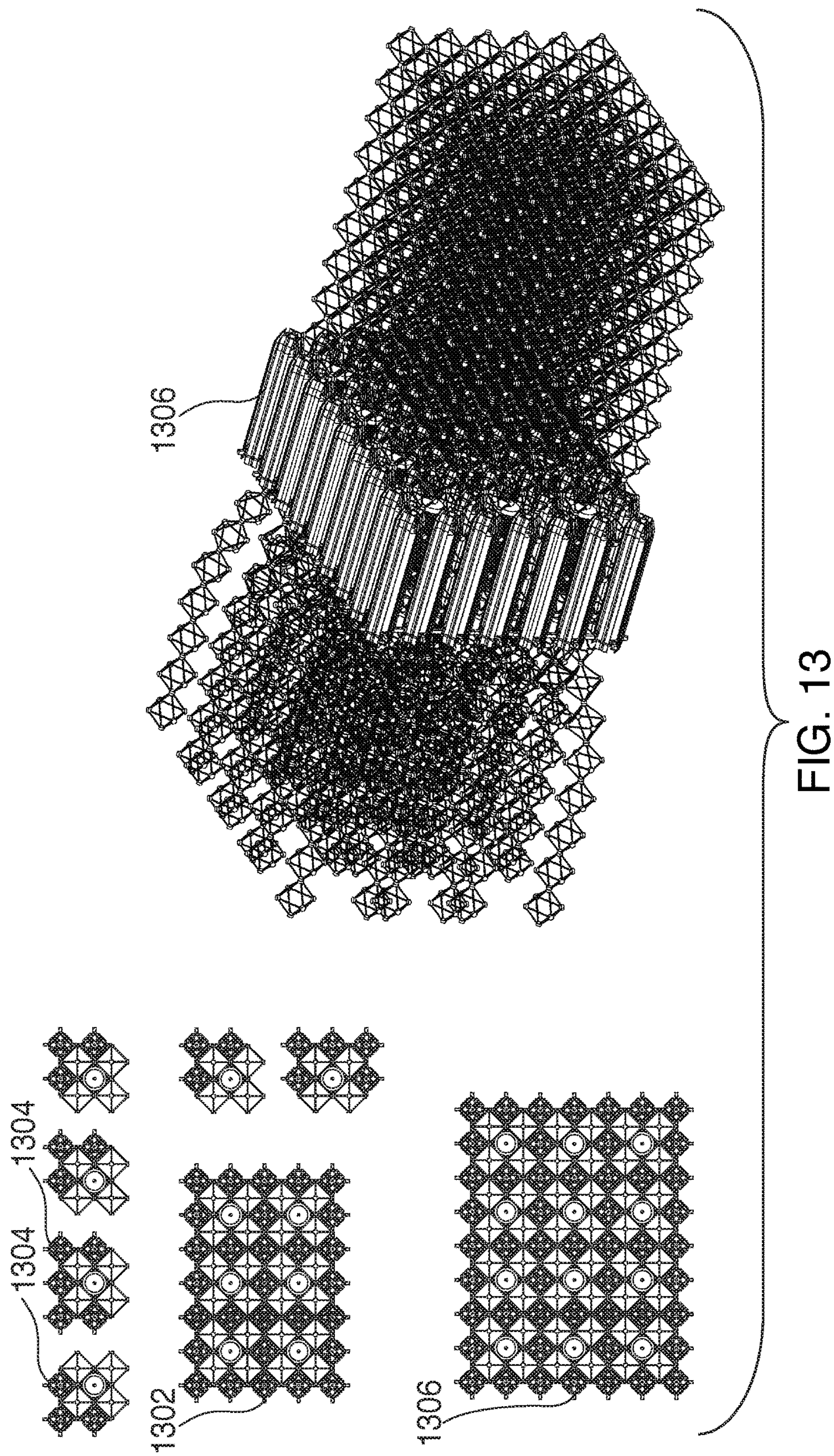
FIG. 13 shows MILES modular scaling.

FIG. 13 shows MILES modular scaling (L TO R). FIG. 13 depicts a 6×4 lattice extruder 1302 with additional units nearby 1304, where the new units are added to make an 8×6 lattice extruder 1306. The basic MILES module can be added incrementally to result in customizable MILES platforms. The direction of expansion (up, down, left right) as well as the boundary condition (side, corner) will determine the required composition of the new MILES modules (i.e.: 3 guide rails, 1 locomotion) as well as the orientation of the sub-components. This design allows a constant ratio of extruded structure to locomotion systems, ensuring that motors do not become overload and stall. Management of material feed chains will be addressed in later designs.

Figure 15:
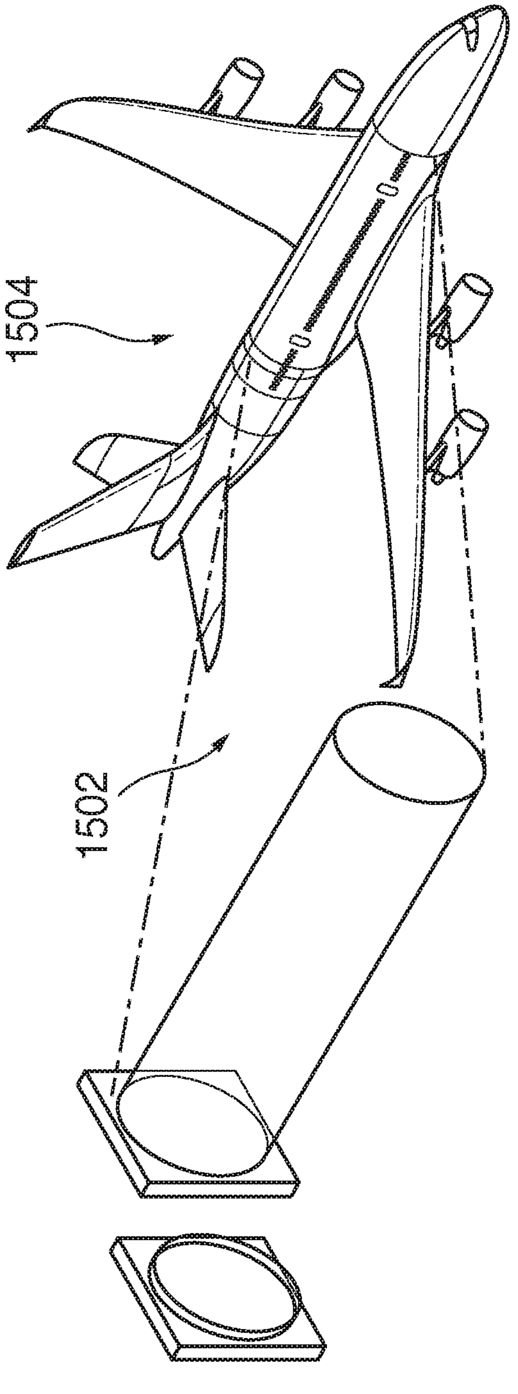
FIG. 15 illustrates the MILES system producing an airplane fuselage.

The extensibility of modules enables the formation of an arbitrarily sized extrusion head that has the ability to extrude, in parallel, complex, discrete cellular lattice structures (FIG. 15). FIG. 15 illustrates the MILES system producing an airplane fuselage (L to R). A large rectangular array of MILES modules 1502 is shown (material feed chains are not shown), with the desired structure extrusion profile shown emerging 1504. The full structure is extruded and now can be extracted and used. In this case, it can be skinned and assembled to wing and fairing structures to be used as the fuselage of a plane.

As described, MILES consists of three main components: the material feed is a chain of pre-assembled voxels, fed through a forming die that locks the elements together, and is fed by motion mechanism.

The pre-assembled voxel chains are fed into the MILES platforms with a specific distance constraint defining the spacing between the elements. In other systems, such as the standard zipper, the locking components are fed along a secondary tensile carrier that enforces the distance constraint. In MILES the interlocking elements are integral to the structural lattice itself, reducing the feed stock to a single type of feed element.

Upon entering the locomotion and joining station, they are forced into their final configuration by guide rails that are essentially a forming die. This forming die may be constructed as a modular system attached to a gridded support structure. The two universal cartridge types are the driver cartridge or motion mechanism, and, the rail cartridge. In one embodiment the driver cartridge consists of a motorized screw drive that pushes along the rigidly assembled structure. The rigidly assembled structure, still being attached to the feedstock, pulls the feedstock into the forming module as it is pushed out of the module. The rail cartridge has 4 guide rails to support the feed stock from all necessary directions such that a single drive mechanism can push four strings of feedstock (FIG. 12).

Next, the passive locking feature that rigidly constrains the neighboring strings is actuated, reversibly connecting the parts without any need for external hardware, as it passes by an actuating feature along its way through the forming die. The design for this locking feature is based on a self-tightening cammed pin (this locking mechanism is similarly used in triple for attaching a chuck to the spindle of a lathe (FIG. 14)) with a tab that is pushed by a passive feature on the machine. Tapered leading edges on the male interface help with alignment, and the locking pin is captive, not external. Pin rotation occurs passively as the elements are pulled past a tab feature on the extrusion head that forces the lever arm of the pin to rotate. Motion of the voxel elements is provided by central locomotion worm gear pushing on the already assembled rigid structure.

What is further unique to MILES is its modularity. The basic MILES unit can extrude a 4-voxel (2×2) lattice, and to do so uses 8 guide rail modules and a single central locomotion module. These modules are designed to mount to a rear mounting plate grid, which can be of any dimension necessary. This modular system enables simplified expansion with the addition of more modules. This allows customized extruder platforms to be quickly setup without relying on monolithic gantry-type elements. This way it will be possible to extrude large high performance structures such as aerospace components.

Figure 16:
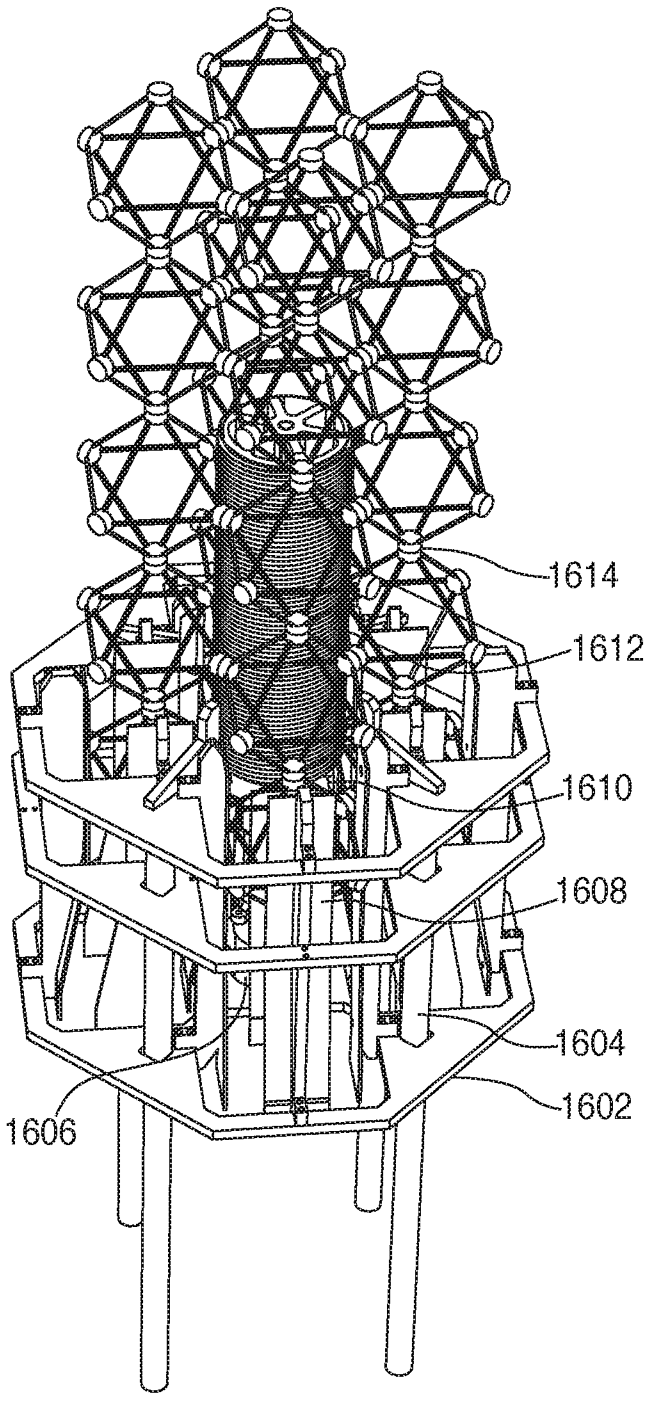
FIG. 16 is a side view of a prototype MILES.
Figure 17:
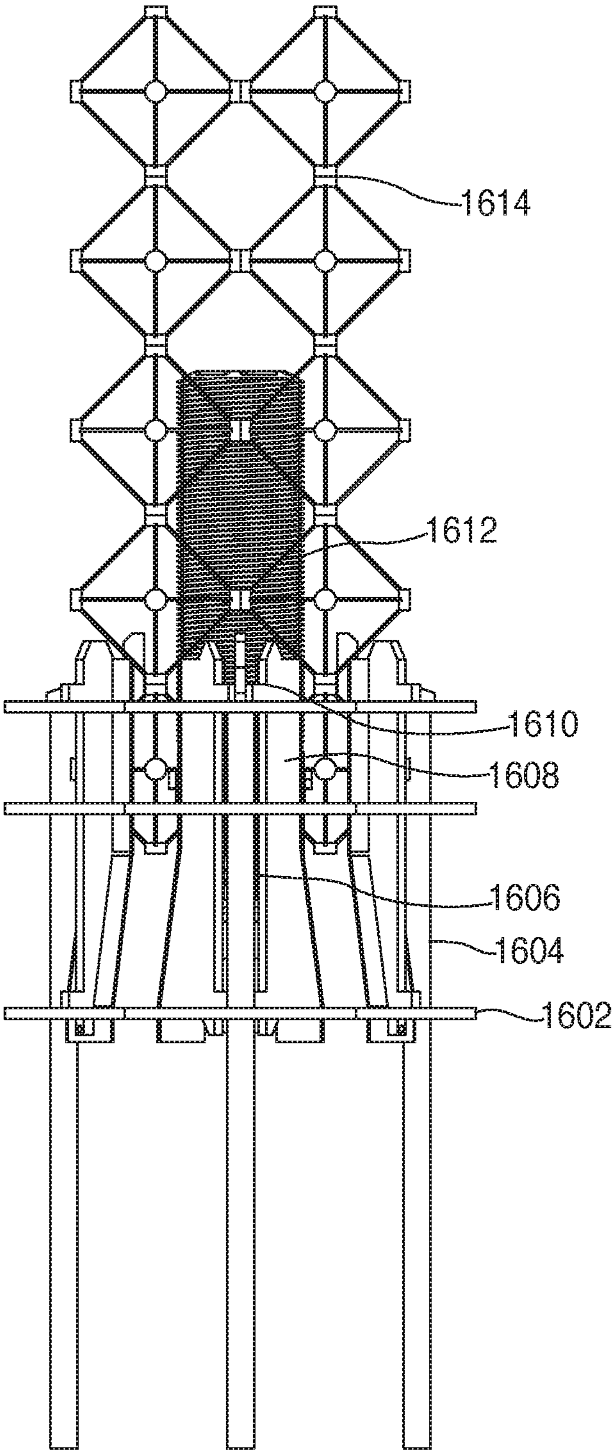
FIG. 17 is a front view of a prototype MILES.

FIG. 16 and FIG. 17 are a side and front view, respectively, of a prototype MILES. Shown is rear mounting plate grid (1602), guide rail structure (1604), motor (1606), guide rail surfaces (1608), passive cam-lock enforcement armature (1610), worm gear material feed locomotion mechanism (1612), and assembled structure with locked joints (1614).

While the above specification and examples provide a description of the invention, many embodiments of the invention can be made without departing from the spirit and scope of the invention. It is to be understood that the foregoing embodiments are provided as illustrative only, and does not limit or define the scope of the invention. Various other embodiments are also within the scope of the claims.

What is claimed is:

1. A method of constructing a lattice structure, comprising:

defining a path, established by an assembly head mandrel, that tiles track along as they are placed or removed from the lattice, the mandrel having tracks that enforce a trajectory path;

connecting together along respective nodes, the tiles formed of a single geometric shape such that the connected tiles enclose a volume along the trajectory path, wherein the respective nodes comprise a loop interface feature whereby a node of one tile surrounds at least part of the node of one or more adjacent tiles; and repeating the connecting step by adding new tiles to unconnected nodes of the previously connected tiles to define a lattice volume, such that the lattice volume grows in a single direction along a centroidal axis shared by stacking the tiles consistent with the trajectory enforced by the mandrel.

2. The method of claim 1, wherein the tiles are triangles.

3. The method of claim 2, wherein the tiles assemble into octahedra.

4. The method of claim 3, further comprising connecting several octahedra together, one octahedron being connected to and aligned with another octohedron along three shared nodes, three shared struts, and two shared faces, such that the several connected octahedra form complex multiples of volumes while retaining node connectivity and stiffness.

5. The method of claim 3, further comprising assembling the octahedra face to face, by placing each octahedron upon a previous octahedron cell, such that only three triangular tiles are required to effectively form the eight faces of an octahedron cell.

6. The method of claim 5, wherein the octahedra are statically and kinematically determinate following Maxwell's stability criterion, and each assembled octahedra consists of six joints as nodes connected by twelve noncollinear struts.

7. The method of claim 6, wherein each of the nodes is connected by six noncollinear struts, exactly constraining each node.

8. The method of claim 2, wherein the loop interface feature transmits primarily axial loads along struts of the triangles.

9. The method of claim 1, wherein the tiles assemble into tetrahedra.

10. The method of claim 1, wherein the lattice volume comprises a truss structure that forms an exactly constrained, triple, co-directional cross-linked helix that distributes axial loads into transverse loads.

11. The method of claim 1, further comprising combining lattice volumes with other lattice volumes to form multiples of connected volumes each along the same axial direction.

12. The method of claim 1, wherein once tiles are connected, moment couples transmit through a loop interface feature.

13. The method of claim 1, wherein a constrained and load bearing cell is formed when a sufficient number of new tiles are added to unconnected nodes of previously connected tiles such that nodes of new tiles are locked to a node of a previously connected tile.

14. The method of claim 1, wherein the alignment of nodes, struts, and loop interface features provide a system where tension and compression of the overall lattice assembly load joints into a stable configuration such that secondary fastener components such as pins, clips, or screws are not used.

15. The method of claim 14, further comprising inserting secondary fastener components at nodes, whereby redundant connections may protect against unexpected load conditions.

16. The method of claim 1, further comprising selecting tiles for the properties that the lattice volume is independent of material modulus of elasticity, where elastic coupling or flexural joints are not required, nor is a secondary fastener required to transmit load.

17. The method of claim 1, wherein elastic joints are used to interlock the loop interface features.

18. The method of claim 1, wherein the tiles have been produced of one or more of the following: sheet-metal, concrete, formed wood, composites, injection molding, casting, 3d printing, additive manufacturing, or subtractive manufacturing.

19. The method of claim 1, wherein tiles feed from one or more of the following: locally in a magazine cartridge, a reel of components, or remotely in a hopper system.

20. The method of claim 1, wherein the lattice volume has the property that it can be disassembled in reverse.

21. A product produced by the process of claim 1.

22. The method of claim 1, wherein tiles have the property that, once connected together, load paths align directly at the loop interface feature between tiles.

23. The method of claim 1, further comprising defining a distance constraint between parts that are to be collinear in their placed configuration, wherein the distance constraint is established by a carrier such as a belt, cable, or chain.

* * * * *